United States Patent [19]

Kuibers-Kiewik et al.

[11] 4,394,501
[45] Jul. 19, 1983

[54] COMPOSITION FOR PREVENTING PLATE OUT IN EXTRUSION EQUIPMENT

[75] Inventors: Walfrida G. E. Kuibers-Kiewik, Hengelo; Johannes Akkerman, le Dedemsvaart; Johan Gons, AA Dedemsvaart, all of Netherlands

[73] Assignee: Wavin B.V., Zwolle, Netherlands

[21] Appl. No.: 231,271

[22] Filed: Feb. 4, 1981

[30] Foreign Application Priority Data

Apr. 2, 1980 [NL] Netherlands ........................ 8000690
Nov. 19, 1980 [NL] Netherlands ........................ 8006314

[51] Int. Cl.$^3$ .............................................. C08K 3/34
[52] U.S. Cl. ................................ 528/485; 264/176 R; 524/444; 524/445
[58] Field of Search ............... 528/485, 487, 488, 489; 525/1, 2, 3, 4

[56] References Cited

U.S. PATENT DOCUMENTS 2,772,322 11/1956 Witt ................................. 526/344.3
3,424,645 1/1969 Ohsol ................................. 526/344
3,449,291 6/1969 Lerman ............................. 260/42.49
3,775,357 11/1973 Nemeth ............................ 260/42.49

OTHER PUBLICATIONS

Encyclopedia of Chem. Tech., vol. 7, pp. 378, 379, 380, 392, 393, (1965).

Primary Examiner—C. A. Henderson
Attorney, Agent, or Firm—Wilkinson, Mawhinney & Theibault

[57] ABSTRACT

A composition of polyvinylchloride containing the usual additives and a plate out preventing, chemically or physically acting drying agent. The drying agent is preferably an expanded and finely ground aluminium-silicate, having a high oil absorption and water absorption and preferably low amounts of earth alkaline metals. The plate out preventing drying agent is incorporated in a normal additive composition in order to avoid handling of voluminous masses of drying agent. This incorporation is executed by mixing with a mixture of additives or during the chemical reaction for preparing the additive composition.

4 Claims, 3 Drawing Figures

COMPOSITION FOR PREVENTING PLATE OUT IN EXTRUSION EQUIPMENT

BACKGROUND OF THE INVENTION

1. Field of the Invention

The present invention relates to a plastic composition on the basis of a vinylhalide or a vinylidene halide polymer or copolymer, more particularly substantially plasticizer free polyvinylchloride, containing usual additives, such as stabilizers and/or lubricating agents.

2. Description of the Prior Art

Plastic compositions of this type on the basis of a vinylchloride or vinylidene chloride polymer or copolymer composition, are known in the art.

In processing plastic compositions on the basis of thermoplastics, more particularly hard polyvinylchloride, problems may occur, depending upon the type of additives, such as stabilizers, lubricants, pigments and the like and fillers, such as chalk, kaolin, calcium salts, asbestos etc. These problems are inherent with the fact that the thermoplastic mass including additives and fillers, may tend to adhere to the metal surfaces of molding tools of the extruders, viz the extrusion nozzles, due to which deposits of additives and/or partially decomposed polymers will be formed upon said metal surfaces, which deposits will give rise to undesired changes in the surface of the product to be extruded such as webs, sheets, pipes, foils and the like. This phenomenon is known in practice as a so-called deposit of additives, or plate out. Said plate out therefore concerns a deposit of agents from a plastic composition at the time of extruding certain products. Said plate out may even so hamper the flow velocity of the composition to be processed through the extrusion nozzles, that the shape of the final product will no longer be correct.

From the above it follows, that in actual practice it is essential to interrupt the extrusion when such deposits occur upon metal surfaces of the molding tools of the extruders, at the time when changes are observed in the surface of the products being extruded, in order to remove said deposits or plate out. Consequently both a temporary stop of the production and considerable losses of material will be involved.

Naturally, plastic pipes showing scratches at their outsides or their insides cannot possibly be delivered, as in that case said scratches will decrease the mechanical properties of the pipes, and will also cause these pipes not to be accepted by purchasers.

This also holds for plastic foil, produced on calender rollers.

Efforts have been made to alleviate said plate out by including silane additives in the respective compositions but said additives have not proved to be sufficiently effective.

The latter also results from the fact that the deposits, generally called plate out, as described hereinbefore, strongly depend on the type of vinylchloride polymer, or vinylidene chloride polymer as used.

The deposit phenomenon particularly occurs when polyvinylchloride is employed, obtained by suspension polymerization, whilst no deposits or plate out or almost no deposits or plate out will occur when a polyvinylchloride is employed, obtained by emulsion polymerization.

SUMMARY OF THE INVENTION

In view of the foregoing factors and conditions of the prior art it is a primary object of the present invention to provide a solution for the abovementioned problems.

This object is attained according to the present invention in that the composition comprises a physically or chemically acting drying agent, at least binding escaping water on plasticizing said plastics e.g. for extrusion or injection molding.

It has been found that the use of such a plastic composition considerably reduces or even eliminates a deposit or plate out upon calender rollers during calendering plastic foil, or on extrusion nozzles when extruding the composition.

The advantages of a plastic composition in accordance with the present invention are particularly observed in using polyvinylchloride types obtained by means of suspension and/or mass-polymerization.

In all probability the good results, obtained with the composition in accordance with the present invention, in the case of polyvinylchloride obtained by suspension polymerization, depend on the way of forming said polymer. In a suspension polymerization the polymer particles are built up from particles formed by coagulation during said polymerization and intra-cellular spaces in between said particles which are filled with water and hydrochlorid acid.

Furthermore a physically water-attracting protecting colloid is used during the process, serving as a hydrophilic skin around the polymer grain. Due to the presence of said hydrophilic skin, said molecular water and hydrochloric acid will remain bonded in the polymer particles, and cannot escape during degasing which takes place at temperatures of, for example, 110° C.

As soon as said particles are subjected to high temperatures, in the plastification zone, said water and hydrochloric acid will be able to escape, due to a decomposition of the granular structure, which will then give rise to the abovementioned deposits or plate outs. Analysis of said deposits has proved that, in case of extrudable plastic compositions including metal salts, said deposits or plate outs consist of calciumcarbonate and of leadoxidechlorides in the form of $2PbO.2PbCl_2$ and $3PbO.PbCl_2.H_2O$ and it is assumed that said leadoxidechlorides are formed by hydrochloric acid from the polyvinylchloride, reacting with tribasic leadsulfate and dibasic lead stearate, added as stabilizers to said polyvinylchloride.

Removing said hydrochloric acid being included in the polymer particles and the hydrochloric acid which is being split off by heating the polyvinylchloride (under processing conditions) prevents the formation of leadoxide chlorides and therefore of plate out.

Another solution of preventing a plate out is to bind the escaping water, so that the hydrochloric acid cannot possibly be ionized and is therefore, not reactive.

The latter may take place by adding a drying agent.

Said drying agent preferably consists of a substance which binds or absorbs water at a temperature of over 120° C. and at a pressure of over 10 atm., preferably at a temperature of over 140° and at a pressure of about 25 atm.

Suitable physically or chemically acting drying agents are water-free sodium sulfate, carbon and carbonblacks, calciumoxide, coated calcium oxide (Calaxol) earth alkaline oxides and sodium aluminium silicates in the form of zeolites. Very good results are particularly obtained when a silica is used e.g. diatomaceous earth and preferably an expanded and ground aluminium silicate. Said drying agents bind water at a temperature of 190° C. under processing conditions, existing in extruders and calender rollers.

Preferably the drying agent also binds hydrochloric acid.

The drying agent should preferably and substantially have a particle size of less than 10 microns, since a size of over 10 microns may disadvantageously influence the properties of the plastic product. Substantially means not more than 8 to 25% particles of more than 10 microns.

The plastic composition, particularly of substantially plasticizer free polyvinylchloride, should preferably contain 0,05 parts to 5 parts, and more preferably 0,1 parts to 1 part of drying agent per 100 parts of polymer. The amount of drying agent preventing plate out amounts to at most 0,8% b.w. and preferably at most 0,5% b.w. in case of a plasticizer free polyvinylchloride.

A preferred expanded and ground aluminium silicate, hereinafter mentioned Celite or Celite PF, as drying agent is a product presenting the following properties:

| Ignition loss 983° C. | 1,0 |
|---|---|
| $SiO_2$ | 74,7 |
| $Al_2O_3$ | 13,2 |
| $Fe_2O_3$ | 0,67 |
| $P_2O_5$ | trace |
| $TiO_2$ | 0,10 |
| CoO | 0,83 |
| MgO | 0,03 |
| $Na_2O$ | 4,40 |
| $K_2O$ | 4,08 |
| sulfates | none |
| | 100,00 |

Particle size distribution of two different types:

| Type I over 15 microns 8% | Type II over 40 microns 2% |
|---|---|
| Type I over 10/15 microns 7% | Type II over 20/40 microns 14% |
| Type I over 8/10 microns 25% | Type II over 15/20 microns 12% |
| Type I over 6/8 microns 30% | Type II over 10.15 microns 22% |
| Type I over 5/6 microns 13% | Type II over 8/10 microns 13% |
| Type I over 4/5 microns 9% | Type II over 6/8 microns 14% |
| Type I over 2/4 microns 6% | Type II over 5/6 microns 6% |
| Type I over 1/2 microns 1% | Type II over 3/5 microns 11% |
| Type I under 1 microns 1% | Type II over 1/3 microns 5% |
| | Type II under 1 microns 1% |
| Physical properties | | |
| Loose weight pcf | 4,9 | 4,1 |
| Wet density | 9,9 | 8,8 |
| Water absorption | 398% | 520% |
| Oil absorption | 313% | 397% |
| 150 mesh | 6,8 | 19,2 |
| pH | 7,6 | 7,6 |

The expanded and ground aluminium silicates according to the invention preferably comprise more than 60% $SiO_2$, more preferably 60-85% $SiO_2$ and 8 to 30% of $Al_2O_3$, more preferably 10-15% of $Al_2O_3$, less than 10% CaO and more than 5%, preferably 5-15% $Na_2O+K_2O$ and substantially no sulfates. The oil absorption is preferably between 200 and 700% and a water absorption of 200-700% and less than 10% $TiO_2+Fe_2O_3+CaO+MgO$.

The present invention is also embodied in an additive composition for adding to a plastic composition on the basis of a vinylhalide polymer or a copolymer composition and to a method of preparing such an additive composition.

Such a method of preparing an additive composition by hot-mixing of additives and by subsequently cold-grinding of the mixture obtained, is known per se.

It is also known to prepare an additive composition by reacting at least low melting waxes, fatty acids and metal oxides and to use the obtained mixture as an additive composition.

Said known additive compositions present the drawback that dependent upon the type and kind of additives added to the plastics, such as stabilizers, lubricants, pigments and the like and fillers such as chalk, kaolin, calcium, salts, asbestos etc. they are unable to prevent a formation of deposits on metal surfaces, such as extrusion nozzles and calender rollers which come into contact with the plastic composition on processing the latter, which contact will cause additives and/or partially decomposed polymers to be deposited upon said metal surfaces, which deposits may give rise to undesired changes in the surface of the products to be manufactured. such as sections, sheets, pipes, foils or film etc. Said phenomenon is known as a so-called deposit of additives, also called "plate out". A plate out therefore concerns the deposit of agents from the plastic composition upon the metal surfaces directly during the manufacture of articles, which deposits may lead to interruptions in the processing of plastics, such as an extrusion or calender operation.

Furthermore even minimum deposits may cause the flow of composition to be processed through the extrusion nozzles, to be hampered in such a manner that molding of the respective products is no longer ensured.

It is another object of the present invention to obviate said disadvantage.

This object is attained in accordance with the invention in that the additive composition contains a physically or chemically acting drying agent, at least binding escaping water on plasticizing the plastics.

Preferably a drying agent is present which also binds hydrochloric acid. Examples of suitable drying agents have already been given.

Although an additive composition and a drying agent may be added separately to a plastic composition, said method is disadvantageos as most of the drying agents according to the invention are very voluminos, so that they may give rise to an inhomogeneos division in the plastics or to interruptions during the processing of the plastic composition.

By mixing an additive composition with a drying agent, an additive composition with drying properties is obtained which composition has a far smaller volume than the separate additives of the additive composition.

Due to the latter, the size of metering devices used in the mixing process is restricted to a minimum.

Very advantageosly a mixture of additives and drying agent is formed as particles, particularly powder, flakes or scales.

In accordance with the present invention an appropriate additive composition is preferably prepared by hot-mixing the additives and the aforementioned drying agent and by subsequently cold-grinding said mixture.

According to another embodiment, the additives are formed by a reaction of at least low melting additives, preferably fatty acids and metal oxides, whereupon the obtained reactive product is mixed with the aforementioned drying agent, which reaction and mixing are preferably carried out simultaneosly.

When using lead sulfate as an additive in the latter method, it may be preferred to add the lead sulfate to the respective composition as the last additive.

On the other hand, it is also recommended to prevent possible interruptions in reactions of calcium oxide to calcium stearate and/or of lead oxide to lead stearate, by adding the respective drying agent after conversion of the lead oxide.

It is finally recommended to add the drying agent prior to adding the lead sulfate, as after mixing said lead sulfate with the additive composition, the latter becomes very viscous, thus causing a homogeneos division of the drying agent in the molten mass, to become very complicated.

The added quantity of drying agent is preferably so chosen that during adding such an additive composition 0,05 to 5 parts, preferably 0,1 to 1 part of drying agent per 100 parts of polymer is (are) added.

The features of the present invention which are believed to be novel are set forth with particularity in the appended claims.

Other claims and many of the attendant advantages will be more readily appreciated as the same becomes better understood by reference of the following detailed examples and accompanying drawing.

DESCRIPTION OF THE DRAWING

The present invention will now be illustrated with respect to an embodiment in which a polymer composition is used as described in table A.

When extruding compositions according to table A, during a predetermined period of time, deposits will be formed upon the surface of the passage channels of the extrusion nizzle, which deposits may either be slight or rather substantial. The observed plate out is defined in accordance with a scale ranging from 1 to 10, whereby 1 = no plate out
2 or 3 = slight film of plate out
4 or 5 = film of plate out
6 or 7 = thick film of plate out
8 or 9 = layer of plate out
10 = thick layer of plate out The above data are obtained by inspecting an extrusion nozzle by three persons, the plate out being defined at points a, b and c, shown in FIGS. 1, 2 and 3.

Figure 1:
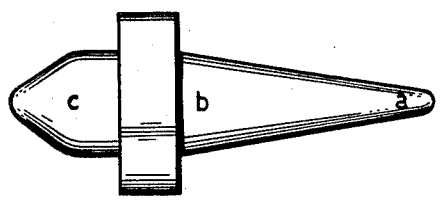
FIG. 1 shows the inner cone.
Figure 2:
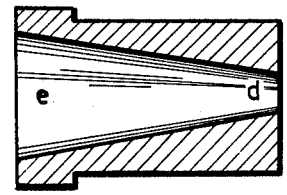
FIG. 2 shows the outer cone and FIG. 3 shows the extrusion opening.
Figure 3:
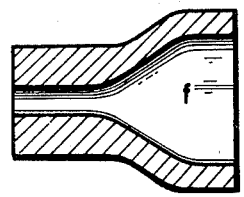

The final result is determined on the basis of the following formula:

$$\text{plate out is } \frac{(3 \times a) + b + c + (3 \times d) + e + f}{10}.$$

Plate outs at points a and d are multiplied by a factor 3, as plate outs at those points will produce scratches upon plastic pipes.

TABLE A

| PVC type | 805 | 1114 | 1115 | 1116 | 1117 | 1082 | 812 | 830 |
|---|---|---|---|---|---|---|---|---|
| S—PVC $K^I$, value 66,5 ± 1 volume weight 546 ± 20 g/l | 100 | | | | | | | |
| S—PVC $K^{II}$, value 69,5 ± 1 volume weight 520 ± 20 g/l | | 100 | 100 | 100 | 100 | | | 100 |
| S—PVC $K^{II}$, value 66,5 ± 1 volume weight 520 ± 20 g/l | | | | | | 100 | | |
| S—PVC $K^{III}$, value 67 ± 1 volume weight 570 ± ^ 30 g/l | | | | | | | 100 | |
| 3 PbO.PbSO$_4$ | 0,5 | 0,5 | 0,5 | 0,5 | 0,5 | 0,5 | 0,5 | 0,5 |
| 2 PbO—Pb stearate | 1,5 | 1,5 | 1,5 | 1,5 | 1,5 | 1,5 | 1,5 | 1,5 |
| Calcium stearate | 0,5 | 0,5 | 0,5 | 0,5 | 0,5 | 0,5 | 0,5 | 0,5 |
| Tiofin R 70 (TiO$_2$) | 1,0 | 1,0 | 1,0 | 1,0 | 1,0 | 1,0 | 1,0 | 1,0 |
| Cetylalcohol Alfol 2022 | 0,15 | 0,12 | 0,15 | 0,15 | 0,15 | 0,15 | 0,15 | 0,15 |
| Gl 8208 (fatty alcohol) | 0,3 | 0,3 | 0,3 | 0,3 | 0,3 | 0,3 | 0,3 | 0,3 |
| N—TPP S 30 (sodiumtripolyphosphate) | | 0,1 | | | | | | |
| N TPP S 50 (sodiumtripolyphosphate) | | | 0,1 | | | | | |
| Na$_2$SO$_4$.OH$_2$O | | | | 0,1 | | | | |
| Na$_2$SO$_4$10H$_2$O | | | | | 0,23 | | | |

N TPP S 30 is a sodiumtripolyphosphate, 30% of which being in phase 1 and 70% in phase 2,
N TPP S 50 is a sodiumtripolyphosphate, 50% of which being in phase 1 and 50% in phase 2.

DESCRIPTION OF EXAMPLES

EXAMPLE I

The compositions having the code numbers 805, 1082, 812 and 820 are subjected to extrusion tests for measuring plate out. For the compositions 805, 1082, 812 and 830 plate out values have been found of 3, 5, 7, 5 respectively. Obviously commercially obtainable polyvinylchlorides have a different plate out.

The important influence of water upon the plate out formation appears from the fact that the plate out value of composition 805 will increase from 3 to 5, when 44,5 ml of water is added to said composition through the degasing opening of the extruder during extrusion for 6 min. Leadoxide chlorides were found in the plate out as formed.

If, however, a polyvinylchloride composition would be used, containing other metal salt than lead salts as stabilizers, other metal chlorides might be produced.

It is obvios that the type of polyvinylchloride used in composition 805 will not result in much plate out, which is probably inherent with the manner of preparing the polymer.

EXAMPLE II

Compositions 1114, 1115, 1116, and 1117 without plasticizer are subjected to extrusion tests, using a polyvinylchloride type II being sensible to plate out.

Said compositions show plate out values of 2, 2, 2 and 5.

The low plate out value of composition 1114 is due to the fact that said composition contains sodiumtripolyphosphate in the form of a preparation containing 30% of sodium tripolyphosphate (phase 1) and 70% of sodium tripolyphosphate (phase 2). The composition 1115 also has a very low plate out value of 2, due to the presence of sodium tripolyphosphate in the form of a composition containing 50% of sodium tripolyphosphate (phase 1) and 50% of sodium tripolyphosphate (phase 2). Thus, it will be obvios that the use of phase 1 or phase 2 does not influence the result at all.

The composition 1116 has a low plate out value because of the presence of water-free sodiumsulfate, As soon as sodiumsulfate containing water is used, the plate out value will be 5, from which clearly appears that water has a very disadvantageos influence upon the plate out.

EXAMPLE III

Starting from polyvinylchloride type II three various different compositions are prepared, to wit (i) a composition according to code number 830 as described in table A;

(ii) a composition as composition 830, furthermore containing coated calciumoxide in the form of Caloxol CPH (95% calciumoxide and 4% DAP) (composition 1168) and (iii) a compositions as composition 830, comprising an additive of an expanded and ground aluminiumsilicate in the form of Celite PF, having a composition as given on page 7 and 8.

Composition 830 showed a plate out of 6, whilst in compositions 1168 and 1169 a constant plate out of 2 was found.

From the above clearly appears that coated calciumoxide and expanded and gound aluminiumsilicate, more particularly in the form of Celite, are very effective for decreasing a possible plate out. Said Celite is an expanded and ground aluminiumsilicate. In the present case Celite PF was used. The same quantity of Celite PF was added to 18 tons of polyvinylchloride, together with normal additives as coloring pigments, lubricating agents, stabilizers, etc. Tubes of 315 mm with longitudinal channels in their walls were extruded from said composition for the period of a week. During said period of time no deposits or plate outs were observed.

EXAMPLE IV

A test is performed with a drying agent in the form of a sodiumtripolyphosphate having a particle size of 100 microns and a sodium tripolyphosphate having a particle size of 5 microns.

Though in both cases a low plate out was observed, the properties of the product obtained might be of lower quality in case of a substantial particle size of 100 microns, particularly with respect to the impact stress resistance and the burst press resistance.

EXAMPLE V 5 kg of calcium stearate, 15 kg of dibasic lead stearate, (2PbO.Pb-stearate), 5 kg of lead sulfate (3PbO.PbSO$_4$) 1,5 kg ethyl alcohol, 3 kg paraffin wax and 1 kg expanded and ground natural aluminiumsilicate as defined hereinbefore are mixed in a Papenmeier mixer at a temperature of 90° C. After cooling, the rigid mass thus obtained is cold-rolled upon a Schwabenthan two roll mill.

An additive composition is thus obtained which has a much smaller volume than the total volume of each of the separate additives.

In order to compare the results, the same additive composition was prepared without adding 1 kg Celite PF.

In order to define the properties of the additive compositions, the same were mixed with a polyvinylchloride having a K-value of 70, obtained by suspension polymerization.

The polyvinylchloride mixtures without plasticizer obtained are quoted in the following table.

| | | |
|---|---|---|
| PVC K 70 | 100 | 100 |
| Titanium dioxide | 1 | 1 |
| Additive composition with aluminium silicate | 3,05 | — |
| Additive composition without aluminium silicate | — | 2,95 |

Observing the respective plate outs after 6 h. extrusion results in the additive composition without aluminium silicate having a plate out value of 5, whereas adding the additive composition according to the invention results in a plate out value of 1.

Obviosly, the method according to the present invention permits the preparation of additive compositions, which give optimum results for preventing a plate out.

EXAMPLE VI

An additive composition is prepared by mixing waxes, cetyl alcohol and stearic acid in quantities as quoted in table B and by subsequently heating said mixture up to a temperature of 120° C. Thereupon calciumoxide is added in a quantity as quoted in the table, whereby the melt is sprayed with a little water in order to improve the conversion of calcium oxide into calcium stearate.

After said conversion from calciumoxide into calcium stearate the quoted quantity of lead oxide is slowly added and the temperature is decreased to about 100° C.

After having obtained a light-colored melt, which implies that the leadoxide has been converted into lead stearate, the quoted quantity of expanded and ground aluminiumsilicate as mentioned hereinbefore is added.

Subsequently lead sulfate is added until the melt shows a homogeneos color.

Furthermore an identical composition is prepared, however without adding said aluminiumsilicate, whereby, however, leadsulfate is also added as the last additive.

So as to avoid possible interruptions of the conversions from calcium oxide into calcium stearate and/or leadoxide into lead stearate, the expanded and ground aluminiumsilicate is only added after the conversion of the lead oxide.

It is recommended to add the silicate prior to adding to lead sulfate as the mixture gets very viscos after having added said lead sulfate, which complicate a good homogeneos division of the aluminiumsilicate in the melt.

The aluminiumsilicate substantially has a particle size of maximal 10 microns and about 11% to 25% has a particle size of more than 10 microns.

TABLE B

| | additive composition | |
|---|---|---|
| Additive | according to invention quantity | not according to invention quantity |
| Paraffin wax | 10,2 kg | 10,2 kg |
| Cetyl alcohol | 5,1 kg | 5,1 kg |
| Stearic acid | 39,7 kg | 39,7 kg |
| Calcium oxide | 1,7 kg | 1,7 kg |
| Leadoxide | 25,4 kg | 25,4 kg |
| Lead sulfate 3PbO.PbSO$_4$ | 16,9 kg | 16,9 kg |
| Expanded and ground aluminium silicate | 3,4 kg | — |

TABLE B-continued

| | additive composition | |
|---|---|---|
| Additive | according to invention quantity | not according to invention quantity |
| Celite PF (vide page 7) | | |

The mixtures obtained after cooling are ground to flakes.

When 2,95 kg of the abovementioned additive composition, however without Celite PF, is added to a mixture of 100 kg polyvinylchloride having a K-value of 70 and 1 kg titanium oxide, the plate out value amounts to 4, whereas a plate out value of 1 is obtained by adding 3,05 kg of the abovementioned additive composition, however, with Celite PF.

The polyvinylchloride has been obtained by suspension polymerization.

EXAMPLE VII

A polyvinylchloride having a K-value of 67 and obtained by suspension polymerization, is extruded by feeding the extruder with a mixture obtained by premixing a separately supplied PVC powder and separately supplied metered quantities of the additive composition in accordance with the invention, as mentioned in Example VI.

From the above it follows that no mixtures of plastics and additive composition are obtained, which are stored.

After a period of 180 hours, practically no plate out is observed.

EXAMPLE VIII

Excellent plate out results of 1 are also obtained by using 0,1% b.w. of an activated carbon (Norite) as anti plate out additive, instead of the abovementioned aluminium silicate.

Though the invention mentions particularly lead additives it will be obvious that similar results are obtained with compositions containing barium, zinc or cadmium additives.

What we claim is:

1. A plastic composition incorporating additives to prevent plate out on molding tools and extruders consisting essentially of particles of polymers of vinylchloride and vinylidene chloride and copolymers thereof and additives selected from the group comprising stabilizers and lubricating agents wherein at least one of said stabilizers and lubricating agents is a metal compound, free of liquids and blowing agents, and a drying agent capable of binding water at temperatures greater than 120° C. and pressures greater than 10 atmospheres and capable of preventing ionization of hydrochloric acid at said temperatures and pressures, said drying agent being an expanded and finely ground aluminum silicate.

2. Plastic composition according to claim 1, in which the drying agent has a particle size of less than 10 micron.

3. Plastic composition according to claim 1, in which the plastic composition contains 0,05 parts to 5 parts preferably 0,1 to 1 part of drying agent per 100 parts of polymer.

4. Plastic composition according to claim 1, in which the plastic being a substantially plasticizer free polyvinylchloride, contains at most 0,8%, b.w. 0,5% b.w. respectively of said drying agent.

* * * * *